United States Patent
Iwashita et al.

(10) Patent No.: US 7,619,384 B2
(45) Date of Patent: Nov. 17, 2009

(54) CONTROLLER FOR DIE CUSHION MECHANISM

(75) Inventors: Yasusuke Iwashita, Fujiyoshida (JP); Tadashi Okita, Fujiyoshida (JP); Hiroyuki Kawamura, Yamanashi (JP); Satoshi Ikai, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 615 days.

(21) Appl. No.: 11/438,394

(22) Filed: May 23, 2006

(65) Prior Publication Data
US 2006/0267535 A1 Nov. 30, 2006

(51) Int. Cl.
*G05B 5/01* (2006.01)

(52) U.S. Cl. .................. 318/619; 318/566; 318/568.22; 318/632; 318/646

(58) Field of Classification Search ............... 318/560, 318/566, 568.16, 568.22, 619, 632, 638, 318/646
See application file for complete search history.

(56) References Cited

U.S. PATENT DOCUMENTS

| | | | |
|---|---|---|---|
| 5,056,038 A | | 10/1991 | Kuno et al. |
| 5,157,597 A | * | 10/1992 | Iwashita ...................... 700/37 |
| 5,435,166 A | | 7/1995 | Sunada |
| 5,581,167 A | * | 12/1996 | Kato et al. .................. 318/609 |
| 5,587,638 A | * | 12/1996 | Kato et al. ............. 318/568.14 |
| 7,049,775 B2 | * | 5/2006 | Iwashita et al. ............. 318/566 |
| 7,331,208 B2 | * | 2/2008 | Fujibayashi et al. ........... 72/454 |

FOREIGN PATENT DOCUMENTS

| | | |
|---|---|---|
| EP | 0 897 110 A2 | 2/1999 |
| JP | 61-115627 | 6/1986 |
| JP | 4-172200 | 6/1992 |
| JP | 5-7945 | 1/1993 |
| JP | 7-164046 | 6/1995 |
| JP | 10-202327 | 8/1998 |
| JP | 10-277791 | 10/1998 |
| JP | 2001-96314 | 4/2001 |
| JP | 2004-301188 | 10/2004 |

OTHER PUBLICATIONS

European Search Report mailed Mar. 18, 2009 issued in European Application No. 06010417.1.
Japanese Notice of Reasons for Rejection mailed Nov. 6, 2007 issued in Japanese Application No. 2005-150574 (including a partial translation thereof).

* cited by examiner

*Primary Examiner*—Bentsu Ro
*Assistant Examiner*—Thai Dinh
(74) *Attorney, Agent, or Firm*—Drinker Biddle & Reath LLP

(57) ABSTRACT

A controller for a die cushion mechanism includes: a spring element that is displaced according to force between the die cushion mechanism and a slide; a force instructor that instructs force; a force detector that detects force; and a speed instruction generator that generates a speed instruction of the servo motor, based on a force instruction value instructed by the force instructor and a force detection value detected by the force detector. The speed instruction generator generates the speed instruction by multiplying a force gain by a force difference determined from a difference between the force instruction value and the force detection value. The speed instruction generator changes the force gain, based on a spring constant corresponding value of the spring element determined from a force indicator that works between the slide and the die cushion.

9 Claims, 10 Drawing Sheets

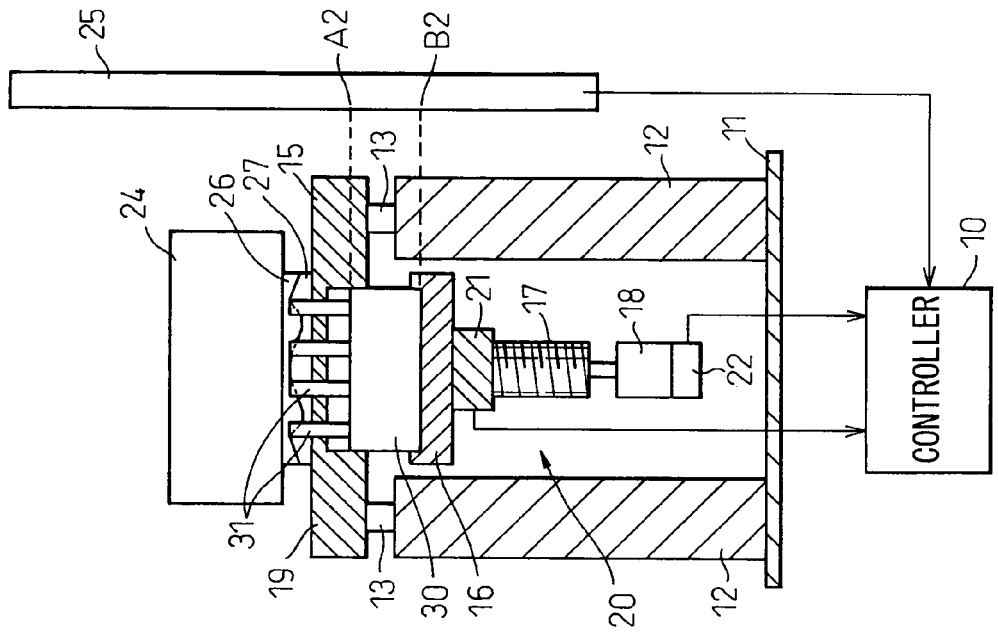
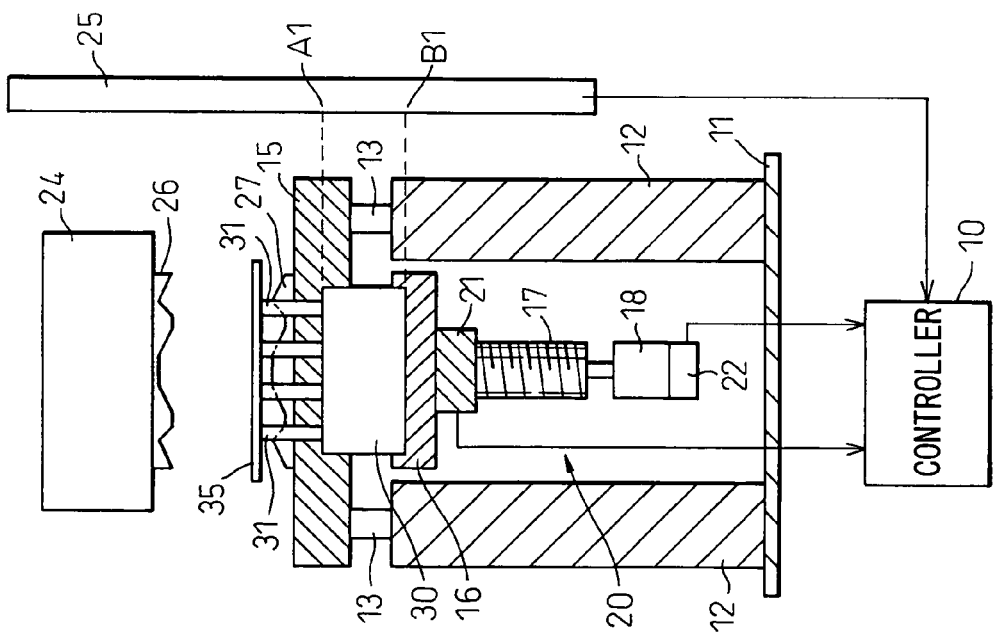

Fig.12a $$\text{CNT} \begin{array}{llll} k_{11} & k_{12} & \cdots\cdots & k_{1n} \\ k_{21} & & & \vdots \\ \vdots & & & \\ k_{m1} & \cdots\cdots\cdots & & k_{mn} \end{array}$$

F

Fig.12b $$\text{CNT} \begin{array}{llll} k_{11} & k_{12} & \cdots\cdots & k_{1n} \\ k_{21} & & & \vdots \\ \vdots & & & \\ k_{m1} & \cdots\cdots\cdots & & k_{mn} \end{array}$$

x

Fig.12c $$\text{CNT} \begin{array}{llll} k_{11} & k_{12} & \cdots\cdots & k_{1n} \\ k_{21} & & & \vdots \\ \vdots & & & \\ k_{m1} & \cdots\cdots\cdots & & k_{mn} \end{array}$$

H

CONTROLLER FOR DIE CUSHION MECHANISM

BACKGROUND OF THE INVENTION

1. Field of the Invention

The present invention relates to a controller for a die cushion mechanism.

2. Description of the Related Art

In a pressing machine that performs press work, such as bending, drawing, and punching, there is known a die cushion mechanism that is provided as auxiliary equipment which adds a predetermined force (pressure), from a supporting member (called a bolster) for supporting a second mold to a movable-side supporting member (generally called a slide) for supporting a first mold to be used for press work, during a press operation. The die cushion mechanism is usually configured as follows. The die cushion mechanism directly or indirectly makes the slide (or the first mold), which is moving in a clamping direction, collide with a movable element (generally called a cushion pad) which is held with a predetermined pressure. The cushion-pad moves together with the slide, while applying force (pressure) to the slide until the slide is declamped after the clamping (molding). During this period, a peripheral area of a processing portion of a material to be processed is sandwiched between the cushion pad and the slide, thereby preventing the occurrence of wrinkles in the processed material.

In order to improve the precision of the press work using the die cushion mechanism, it is required to stably apply constant force (pressure) to the slide, during the period when the cushion pad moves together with the slide. However, most of conventional cushion mechanisms use a hydro-pneumatic power unit as a driving source. In this case, it has been difficult to control the force (pressure) on the slide, to a constant value, in response to a rapid variation of pressure due to an external factor when the slide collides with the cushion pad. In order to make it possible to perform force control with excellent response, a die cushion mechanism using a servo motor as a driving source has been developed in recent years, as disclosed in Japanese Unexamined Patent Publication No. 10-202327.

The die cushion mechanism described in Japanese Unexamined Patent Publication No. 10-202327 has a mechanism for lifting up and moving down a cushion pad disposed below a slide of a pressing machine, in response to the movement of the slide by the servo motor. During a period while the slide moves down (i.e., during a process operation), the slide applies a force to the cushion pad by colliding therewith. Then, the servo motor operates by force control, based on a predetermined force input instruction set corresponding to the position of the cushion pad, thereby adjusting the force (pressure) applied from the cushion pad to the slide while moving the cushion pad together with the slide. Collision and pressure are detected by detecting a load applied to an output shaft of the servo motor via the cushion pad.

According to the conventional die cushion mechanism using the servo motor driving described in Japanese Unexamined Patent Publication No. 10-202327, a set gain used for the control is constant during the press operation of the pressing machine.

However, mechanical characteristic of the die cushion mechanism changes according to the force (pressure) applied between the die cushion mechanism and the slide. Therefore, a physical gain of the force control changes. Consequently, when the force applied between the slide and the die cushion is large, the physical gain becomes large, and vibration easily occurs during the driving. On the other hand, when the force applied between the slide and the die cushion is small, controllability of the die cushion mechanism decreases.

The present invention has been made in the light of the above situation. It is an object of the present invention to provide a controller for a die cushion mechanism that can control the die cushion mechanism with high precision even when the mechanical characteristics changes.

SUMMARY OF THE INVENTION

In order to achieve the above object, according to a first aspect of the present invention, there is provided a controller for a die cushion mechanism that generates force on a slide of a pressing machine using a servo motor as a driving source. The controller of a die cushion mechanism includes: a spring element that is displaced according to force between the die cushion mechanism and the slide; a force instructor that instructs a force to be generated between the die cushion mechanism and the slide; a force detector that detects a force generated between the die cushion mechanism and the slide; and a speed instruction generator that generates a speed instruction of the servo motor, based on a force instruction value instructed by the force instructor and a force detection value detected by the force detector. The speed instruction generator generates the speed instruction by multiplying a force gain to a force difference determined from a difference between the force instruction value and the force detection value. Further, the speed instruction generator changes the force gain, based on a spring constant corresponding value of the spring element determined from a force indicator that works between the slide and the die cushion.

According to the first aspect, because the force gain is changed based on a spring constant corresponding value of a spring element determined from a force indicator, a constant response can be maintained in the process operation of the pressing machine. Even when mechanical characteristics change during the driving, the die cushion mechanism can be controlled with high precision.

According to a second aspect of the invention, there is provided a controller for a die cushion mechanism that generates force on a slide of a pressing machine using a servo motor as a driving source. The controller of a die cushion mechanism includes: a spring element that is displaced according to force between the die cushion mechanism and the slide; a force instructor that instructs a force to be generated between the die cushion mechanism and the slide; a force detector that detects a force generated between the die cushion mechanism and the slide; and a speed instruction generator that generates a speed instruction of the servo motor, based on a force instruction value instructed by the force instructor and a force detection value detected by the force detector. The speed instruction generator generates the speed instruction, by adding a product of an integration value of a force difference and a second force gain to a product of the force difference and a first force gain, the force difference being determined from a difference between the force instruction value and the force detection value. Further, the speed instruction generator changes either one of or both the first force gain and the second force gain, based on a spring constant corresponding value of the spring element determined from a force indicator that works between the slide and the die cushion.

According to the second aspect, because either one of or both the first force gain and the second force gain are changed based on a spring constant corresponding value of a spring element determined from a force indicator, a constant response can be maintained in the process operation of the pressing machine. Even when mechanical characteristics change during the driving, the die cushion mechanism can be controlled with high precision.

According to a third aspect of the invention, there is provided a controller for a die cushion mechanism that generates a force on a slide of a pressing machine using a servo motor as a driving source. The controller of a die cushion mechanism includes: a spring element that is displaced according to force between the die cushion mechanism and the slide; a force instructor that instructs a force to be generated between the die cushion mechanism and the slide; a force detector that detects a force generated between the die cushion mechanism and the slide; a speed instruction generator that generates a speed instruction of the servo motor, based on a force instruction value instructed by the force instructor and a force detection value detected by the force detector; a speed detector that detects a speed of the servo motor; and a current instruction generator that generates a current instruction of the servo motor, based on a speed instruction value instructed by the speed instruction generator and a speed detection value detected by the speed detector. The current instruction generator generates the current instruction by multiplying a speed gain to a speed difference determined from a difference between the speed instruction value and the speed detection value. Further, the speed instruction generator changes the speed gain, based on a spring constant corresponding value of the spring element determined from a force indicator that works between the slide and the die cushion.

According to the third aspect, because the speed gain is changed based on a spring constant corresponding value of a spring element determined from a force indicator, a constant response can be maintained in the process operation of the pressing machine. Even when mechanical characteristics change during the driving, the die cushion mechanism can be controlled with high precision.

According to a fourth aspect of the invention, there is provided a controller for a die cushion mechanism that generates a force on a slide of a pressing machine using a servo motor as a driving source. The controller of a die cushion mechanism includes: a spring element that is displaced according to force between the die cushion mechanism and the slide; a force instructor that instructs a force to be generated between the die cushion mechanism and the slide; a force detector that detects a force generated between the die cushion mechanism and the slide; a speed instruction generator that generates a speed instruction of the servo motor, based on a force instruction value instructed by the force instructor and a force detection value detected by the force detector; a speed detector that detects a speed of the servo motor; and a current instruction generator that generates a current instruction of the servo motor, based on a speed instruction value instructed by the speed instruction generator and a speed detection value detected by the speed detector. The current instruction generator generates the current instruction by adding a product of an integration value of a speed difference and a second speed gain to a product of the speed difference and a first speed gain, the speed difference being determined from a difference between the speed instruction value and the speed detection value. Further, the speed instruction generator changes either one of or both the first speed gain and the second speed gain, based on a spring constant corresponding value of the spring element determined from a force indicator that works between the slide and the die cushion.

According to the fourth aspect, because either one of or both the first speed gain and the second speed gain are changed based on a spring constant corresponding value of a spring element determined from a force indicator, a constant response can be maintained in the process operation of the pressing machine. Even when mechanical characteristics change during the driving, the die cushion mechanism can be controlled in high precision.

According to a fifth aspect of the invention, there is provided a controller for a die cushion mechanism according to any one of the first to the fourth aspects, wherein the force indicator is a force instruction value instructed by the force instructor.

In other words, according to the fifth aspect, the force indicator can be easily used based on a relatively simple configuration.

According to a sixth aspect of the invention, there is provided a controller for a die cushion mechanism according to any one of the first to the fourth aspects, wherein the force indicator is a force detection value detected by the force detector.

In other words, according to the sixth aspect, because the actually detected force detection value is used, the force gain or the speed gain can be changed more properly.

According to a seventh aspect of the invention, there is provided a controller for a die cushion mechanism according to the first or the second aspect, wherein the force gain is changed according to time.

In other words, according to the seventh aspect, the force gain can be changed more properly by considering time.

According to an eighth aspect of the invention, there is provided a controller for a die cushion mechanism according to the third or the fourth aspect, wherein the speed gain is changed according to time.

In other words, according to the eighth aspect, the speed gain can be changed more properly by considering time.

According to a ninth aspect of the invention, there is provided a controller for a die cushion mechanism according to the seventh or the eighth aspect, wherein the time is a time from a start of a collision between the die cushion mechanism and the slide.

Because it is known in advance that the mechanical characteristic changes according to the time from a start of a clamp between the die cushion mechanism and the slide. Therefore, according to the ninth aspect, the force gain or the speed gain can be changed more properly by considering time from a start of a collision.

According to a tenth aspect of the invention, there is provided a controller for a die cushion mechanism that generates force on a slide of a pressing machine using a servo motor as a driving source. The controller of a die cushion mechanism includes: a spring element that is displaced according to a force between the die cushion mechanism and the slide; a displacement detector that detects displacement of the spring element; a die cushion position instructor that instructs a position of the die cushion mechanism so that displacement of the spring element detected by the displacement detector becomes a predetermined displacement; a die cushion position detector that detects a position of the die cushion mechanism; and a speed instruction generator that generates a speed instruction of the servo motor, based on a die cushion position instruction value instructed by the die cushion position instructor and a die cushion position detection value detected by the die cushion position detector. The speed instruction generator generates the speed instruction, by multiplying a position gain to a position difference determined from a difference between the die cushion position instruction value and the die cushion position detection value. Further, the speed instruction generator changes the position gain, based on a spring constant corresponding value of the spring element determined from displacement of the spring element detected by the displacement detector.

According to the tenth aspect, because the position gain is changed based on a spring constant corresponding value of the spring element determined from displacement of the spring element, a constant response can be maintained in the process operation of the pressing machine. Even when mechanical characteristics change during the driving, the die cushion mechanism can be controlled with high precision. In this case, the need for using a force detector can be avoided.

According to an eleventh aspect of the invention, there is provided a controller for a die cushion mechanism that generates a force on a slide of a pressing machine using a servo motor as a driving source. The controller of a die cushion mechanism includes: a spring element that is displaced according to a force between the die cushion mechanism and the slide; a displacement detector that detects displacement of the spring element; a die cushion position instructor that instructs a position of the die cushion mechanism so that displacement of the spring element detected by the displacement detector becomes a predetermined displacement; a die cushion position detector that detects a position of the die cushion mechanism; and a speed instruction generator that generates a speed instruction of the servo motor, based on a die cushion position instruction value instructed by the die cushion position instructor and a die cushion position detection value detected by the die cushion position detector. The speed instruction generator generates the speed instruction by adding a product of an integration value of a position difference and a second position gain to a product of the position difference and a first position gain, the position difference being determined from a difference between the die cushion position instruction value and the die cushion position detection value. Further, the speed instruction generator changes either one of or both the first position gain and the second position gain, based on a spring constant corresponding value of the spring element determined from displacement of the spring element detected by the displacement detector.

According to the eleventh aspect, because either one of or both the first position gain and the second position gain are changed based on a spring constant corresponding value of the spring element determined from displacement of the spring element, a constant response can be maintained in the process operation of the pressing machine. Even when mechanical characteristics change during the driving, the die cushion mechanism can be controlled with high precision. In this case, the need for using a force detector can be avoided.

According to a twelfth aspect of the invention, there is provided a controller for a die cushion mechanism that generates force on a slide of a pressing machine using a servo motor as a driving source. The controller of a die cushion mechanism includes: a spring element that is displaced according to a force between the die cushion mechanism and the slide; a displacement detector that detects displacement of the spring element; a die cushion position instructor that instructs a position of the die cushion mechanism so that displacement of the spring element detected by the displacement detector becomes a predetermined displacement; a die cushion position detector that detects a position of the die cushion mechanism; a speed instruction generator that generates a speed instruction of the servo motor, based on a die cushion position instruction value instructed by the die cushion position instructor and a die cushion position detection value detected by the die cushion position detector; a speed detector that detects a speed of the servo motor; and a current instruction generator that generates a current instruction of the servo motor, based on a speed instruction value instructed by the speed instruction generator and a speed detection value detected by the speed detector. The current instruction generator generates the current instruction by multiplying a speed gain to a speed difference determined from a difference between the speed instruction value and the speed detection value. Further, the current instruction generator changes the speed gain, based on a spring constant corresponding value of the spring element determined from displacement of the spring element detected by the displacement detector.

According to the twelfth aspect, because the speed gain is changed based on a spring constant corresponding value of the spring element determined from displacement of the spring element, a constant response can be maintained in the process operation of the pressing machine. Even when mechanical characteristics change during the driving, the die cushion mechanism can be controlled with high precision. In this case, the need for using a force detector can be avoided.

According to a thirteenth aspect of the invention, there is provided a controller for a die cushion mechanism that generates force on a slide of a pressing machine using a servo motor as a driving source. The controller of a die cushion mechanism includes: a spring element that is displaced according to a force between the die cushion mechanism and the slide; a displacement detector that detects displacement of the spring element; a die cushion position instructor that instructs a position of the die cushion mechanism so that displacement of the spring element detected by the displacement detector becomes a predetermined displacement; a die cushion position detector that detects a position of the die cushion mechanism; a speed instruction generator that generates a speed instruction of the servo motor, based on a die cushion position instruction value instructed by the die cushion position instructor and a die cushion position detection value detected by the die cushion position detector; a speed detector that detects a speed of the servo motor; and a current instruction generator that generates a current instruction of the servo motor, based on a speed instruction value instructed by the speed instruction generator and a speed detection value detected by the speed detector. The current instruction generator generates the current instruction by adding a product of an integration value of a speed difference and a second speed gain to a product of the speed difference and a first speed gain, the speed difference being determined from a difference between the speed instruction value and the speed detection value. Further, the current instruction generator changes either one of or both the first speed gain and the second speed gain, based on a spring constant corresponding value of the spring element determined from displacement of the spring element detected by the displacement detector.

According to the thirteenth aspect, because either one of or both the first speed gain and the second speed gain are changed based on a spring constant corresponding value of the spring element determined from displacement of the spring element, a constant response can be maintained in the process operation of the pressing machine. Even when mechanical characteristics change during the driving, the die cushion mechanism can be controlled with high precision. In this case, the need for using a force detector can be avoided.

According to a fourteenth aspect of the invention, there is provided a controller for a die cushion mechanism that generates force on a slide of a pressing machine using a servo motor as a driving source. The controller of a die cushion mechanism includes: a spring element that is displaced according to a force between the die cushion mechanism and the slide; a die cushion position instructor that instructs a position of the die cushion mechanism; a die cushion position detector that detects a position of the die cushion mechanism;

and a speed instruction generator that generates a speed instruction of the servo motor, based on a die cushion position instruction value instructed by the die cushion position instructor and a die cushion position detection value detected by the die cushion position detector. The speed instruction generator generates the speed instruction, by multiplying a position gain to a position difference determined from a difference between the die cushion position instruction value and the die cushion position detection value. Further, the speed instruction generator changes the position gain, based on a spring constant corresponding value of the spring element determined from a position indicator concerning the die cushion mechanism.

According to the fourteenth aspect, because the position gain is changed based on a spring constant corresponding value of the spring element determined from a position indicator concerning the die cushion mechanism, a constant response can be maintained in the process operation of the pressing machine. Even when mechanical characteristics change during the driving, the die cushion mechanism can be controlled with high precision. In this case, the gain can be changed without detecting displacement of the spring element.

According to a fifteenth aspect of the invention, there is provided a controller for a die cushion mechanism that generates force on a slide of a pressing machine using a servo motor as a driving source. The controller of a die cushion mechanism includes: a spring element that is displaced according to a force between the die cushion mechanism and the slide; a die cushion position instructor that instructs a position of the die cushion mechanism; a die cushion position detector that detects a position of the die cushion mechanism; and a speed instruction generator that generates a speed instruction of the servo motor, based on a die cushion position instruction value instructed by the die cushion position instructor and a die cushion position detection value detected by the die cushion position detector. The speed instruction generator generates the speed instruction by adding a product of an integration value of a position difference and a second position gain to a product of the position difference and a first position gain, the position difference being determined from a difference between the die cushion position instruction value and the die cushion position detection value. Further, the speed instruction generator changes either one of or both the first position gain and the second position gain, based on a spring constant corresponding value of the spring element determined from a position indicator concerning the die cushion mechanism.

According to the fifteenth aspect, because either one of or both the first position gain and the second position gain are changed based on a spring constant corresponding value of the spring element determined from a position indicator concerning the die cushion mechanism, a constant response can be maintained in the process operation of the pressing machine. Even when mechanical characteristics change during the driving, the die cushion mechanism can be controlled with high precision. In this case, the gain can be changed without detecting displacement of the spring element.

According to a sixteenth aspect of the invention, there is provided a controller for a die cushion mechanism that generates force on a slide of a pressing machine using a servo motor as a driving source. The controller of a die cushion mechanism includes: a spring element that is displaced according to a force between the die cushion mechanism and the slide; a die cushion position instructor that instructs a position of the die cushion mechanism; a die cushion position detector that detects a position of the die cushion mechanism; a speed instruction generator that generates a speed instruction of the servo motor, based on a die cushion position instruction value instructed by the die cushion position instructor and a die cushion position detection value detected by the die cushion position detector; a speed detector that detects a speed of the servo motor; and a current instruction generator that generates a current instruction of the servo motor, based on a speed instruction value instructed by the speed instruction generator and a speed detection value detected by the speed detector. The current instruction generator generates the current instruction by multiplying a speed gain to a speed difference determined from a difference between the speed instruction value and the speed detection value. Further, the current instruction generator changes the speed gain, based on a spring constant corresponding value of the spring element determined from a position indicator concerning the die cushion mechanism.

According to the sixteenth aspect, because the speed gain is changed based on a spring constant corresponding value of the spring element determined from a position indicator concerning the die cushion mechanism, a constant response can be maintained in the process operation of the pressing machine. Even when mechanical characteristics change during the driving, the die cushion mechanism can be controlled with high precision. In this case, the gain can be changed without detecting displacement of the spring element.

According to a seventeenth aspect of the invention, there is provided a controller for a die cushion mechanism that generates force on a slide of a pressing machine using a servo motor as a driving source. The controller of a die cushion mechanism includes: a spring element that is displaced according to a force between the die cushion mechanism and the slide; a die cushion position instructor that instructs a position of the die cushion mechanism; a die cushion position detector that detects a position of the die cushion mechanism; a speed instruction generator that generates a speed instruction of the servo motor, based on a die cushion position instruction value instructed by the die cushion position instructor and a die cushion position detection value detected by the die cushion position detector; a speed detector that detects a speed of the servo motor; and a current instruction generator that generates a current instruction of the servo motor, based on a speed instruction value instructed by the speed instruction generator and a speed detection value detected by the speed detector. The current instruction generator generates the current instruction by adding a product of an integration value of a speed difference and a second speed gain to a product of the speed difference and a first speed gain, the speed difference being determined from a difference between the speed instruction value and the speed detection value. Further, the current instruction generator changes either one of or both the first speed gain and the second speed gain, based on a spring constant corresponding value of the spring element determined from a position indicator concerning the die cushion mechanism.

According to the seventeenth aspect, because either one of or both the first speed gain and the second speed gain are changed based on a spring constant corresponding value of the spring element determined from a position indicator concerning the die cushion mechanism, a constant response can be maintained in the process operation of the pressing machine. Even when mechanical characteristics change during the driving, the die cushion mechanism can be controlled in high precision. In this case, the gain can be changed without detecting displacement of the spring element.

According to an eighteenth aspect of the invention, there is provided a controller for a die cushion mechanism according to any one of the fourteenth to the seventeenth aspects, wherein the position indicator is a die cushion position instruction value instructed by the die cushion position instructor.

According to a nineteenth aspect of the invention, there is provided a controller of a die cushion mechanism according to any one of the fourteenth to the seventeenth aspects, wherein the position indicator is a die cushion position detection value detected by the die cushion position detector.

According to a twentieth aspect of the invention, there is provided a controller for a die cushion mechanism according to any one of the fourteenth to the seventeenth aspects, wherein the servo motor drives the slide, the controller further comprises a slide position instruction generator that instructs a position of the slide, and the position indicator is a position instruction value of the slide instructed by the slide position instruction generator.

According to a twenty-first aspect of the invention, there is provided a controller of a die cushion mechanism according to any one of the fourteenth to the seventeenth aspects, wherein the servo motor drives the slide, the controller further comprises a slide position instruction generator that instructs a position of the slide, and a slide position detector that detects a position of the slide, and the position indicator is a position detection value of the slide detected by the slide position detector.

In other words, according to the eighteenth to the twenty-first aspects, a position indicator can be used easily, based on a relatively simple configuration.

According to a twenty-second aspect of the invention, there is provided a controller for a die cushion mechanism according to any one of the tenth to the eleventh, and the fourteenth and the fifteenth aspects, wherein the position gain is changed according to time.

In other words, according to the twenty-second aspect, the position gain can be changed more properly, by considering time.

According to a twenty-third aspect of the invention, there is provided a controller for a die cushion mechanism according to any one of the twelfth, the thirteenth, and the sixteenth and the seventeenth aspects, wherein the position gain is changed according to time.

In other words, according to the twenty-third aspect, the position gain can be changed more properly, by considering time.

According to a twenty-fourth aspect of the invention, there is provided a controller for a die cushion mechanism according to the twenty-second or the twenty-third aspect, wherein the time is a time from a start of a collision between the die cushion mechanism and the slide.

It is known that a mechanical characteristic changes according to time from a start of a clamp between the slide and the cushion mechanism. Therefore, according to the twenty-fourth aspect, the position gain or the speed gain can be changed more properly, by considering time from a start of a collision.

Objects, characteristics, advantages, and other objects, characteristics, and advantages of the present invention will become clearer from the detailed explanation of representative embodiments of the present invention shown in the accompanying drawings.

BRIEF DESCRIPTION OF THE DRAWINGS

In the drawings:

FIG. 1a is a schematic configuration diagram, showing an opened state, of a die cushion mechanism of a pressing machine having a controller according to the present invention;

FIG. 1b is a schematic configuration diagram, showing a closed state, of the die cushion mechanism of the pressing machine having the controller according to the present invention;

FIG. 12a shows one example of a map of a spring constant corresponding value k;

FIG. 12b shows another example of a map of a spring constant corresponding value k; and FIG. 12c shows still another example of a map of a spring constant corresponding value k.

DETAILED DESCRIPTION

Figure 2:
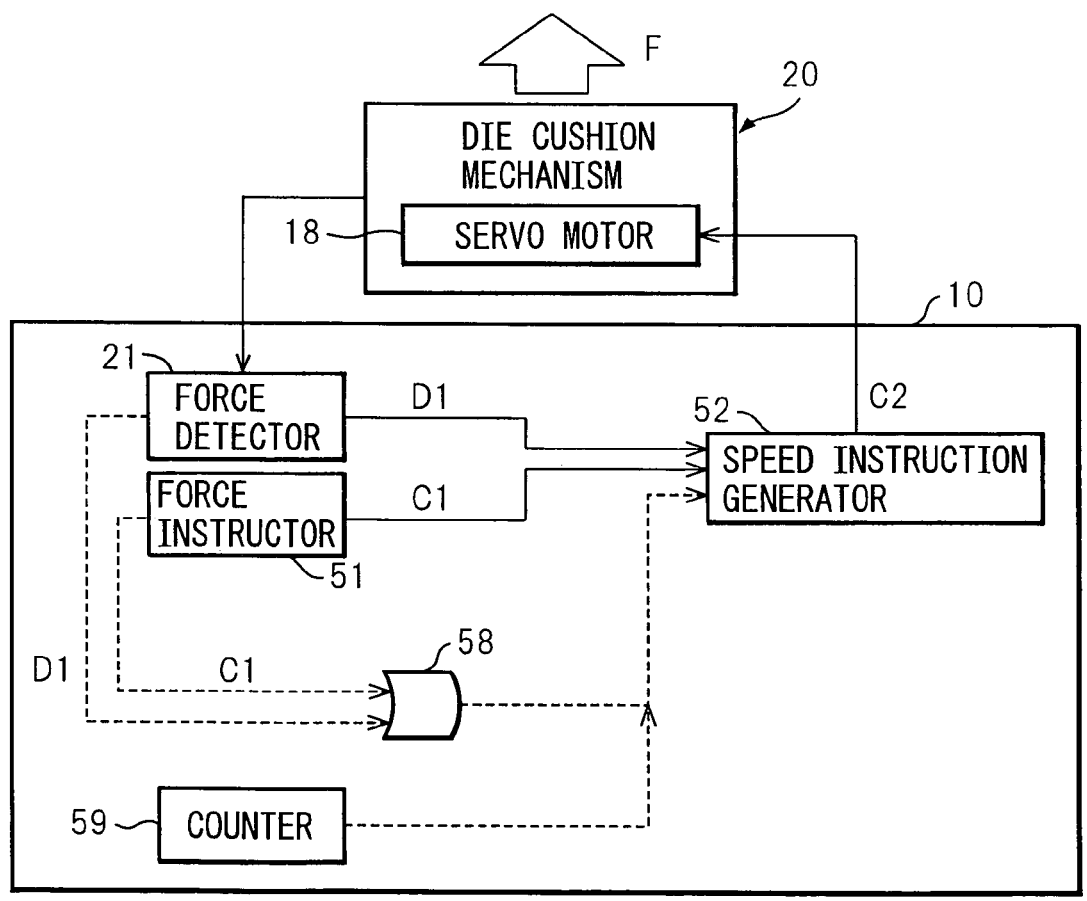
FIG. 2 shows one example of a functional block diagram of a controller of a die cushion mechanism according to a first embodiment of the present invention.

Controllers of a die cushion mechanism according to embodiments of the present invention are explained below with reference to the accompanying drawings. In the drawings, similar elements are assigned like reference numerals. To facilitate understanding, the scales are suitably changed in the drawings.

FIG. 1a and FIG. 1b are schematic configuration diagrams of a die cushion mechanism 20 of a pressing machine having a controller 10 according to the present invention. FIG. 1a depicts an opened state of the pressing machine, and FIG. 1b depicts a closed state of the pressing machine. As shown in FIG. 1a and FIG. 1b, two supporting units 12 extend from a base 11 in a vertical direction. A plane bolster 15 is disposed at the front ends of the supporting units 12, via dampers 13, respectively. A die cushion mechanism 20 is provided below the bolster 15, as shown in these drawings.

The die cushion mechanism 20 according to the present invention includes a spring element 30 that expands and contracts in a vertical direction against the lower surface of the bolster 15, a cushion pad 16 that moves corresponding to the operation of a slide 24 and that is built in the pressing machine, and a servo motor 18 that lifts up and moves down the cushion pad 16. As shown in FIG. 1*a* and FIG. 1*b*, the bottom surface of the spring element 30 is held by the cushion pad 16. An elastic body such as rubber, or a spring or an oil sac can be used for the spring element 30. Alternatively, the spring element 30 and the cushion pad 16 shown in the drawings can be collectively used as the single spring element 30. Plural cushion pins 31 are extended from the top surface of the spring element 30, pass through holes of the bolster 15, and project from the bolster 15. A material to be processed 35 is supported at the front ends of the cushion pins 31.

The slide 24 supports a first mold 26 to be used for press work. The slide 24 moves toward or moves from a second mold 27 supported on the bolster 15, at a speed V required for the press work. The slide 24 may be moved by the servo motor 18.

The cushion pad 16 is disposed in association with the second mold 27, and is connected to an output shaft of the servo motor 18 via a ball screw unit 17. The slide 24 (or the first mold 26) comes directly or indirectly into collision with the cushion pad 16 waiting at a predetermined position, during a period while the slide 24 (or the first mold 26) is moving in a clamping direction. Usually, the cushion pad 16 is configured to move together with the slide 24 while applying predetermined force (pressure) F to the slide 24, during the clamping (molding) and the de-clamping.

The above operation is performed by the controller 10 of the pressing machine according to the present invention. The detailed operation of the pressing machine is explained below with reference to FIG. 1*a* and FIG. 1*b*. During the operation of the pressing machine, the slide 24 moves down, and the first mold 26 presses the plural cushion pins 31 via the material 35 to be processed. As a result, the spring element 30 is compressed in a vertical direction, and the cushion pad 16 is pressed downward. Following the moving down of the cushion pad 16, the servo motor 18 rotates to move down the bolster 15 in a similar manner. When the force (pressure) that works on the spring element 30 becomes large, the cushion pins 31 further move down, and the material 35 to be processed is held between the first mold 26 of the slide 24 and the second mold 27 of the bolster 15, and is pressed. In this case, the bolster 15 moves down slightly due to the force applied from the slide 24. When the slide 24 reaches its bottom dead center, the slide 24 starts moving up, and other members also return to the initial positions thereof. The press work ends there.

As explained above, the controller 10 controls the servo motor 18 to generate a relative pressure (that is, force F) between the cushion pad 16 and the slide 24. As is clear from FIG. 1*a* and FIG. 1*b*, a force detector 21 that detects the pressure (that is, the force F) is connected to the controller 10. Similarly, a motor speed detector 22 provided in the servo motor 18 is also connected to the controller 10. As shown in FIG. 1*a* and FIG. 1*b*, a position detector 25 capable of detecting a position of the spring element 30 in a vertical direction is disposed adjacent to the supporting units 12. This position detector 25 is also connected to the controller 10. The position detector 25 can detect a position of the die cushion mechanism 20 in a vertical direction, particularly a position of the cushion pad 16 in a vertical direction. At the same time, the position detector 25 can detect a position of the slide 24 in a vertical direction. In other words, the position detector 25 can function as a die cushion position detector and a slide position detector. A known force sensor can be used for the force detector 21. A known encoder can be used for the motor speed detector 22. A known linear scale can be used for the position detector 25. An exclusive position detector (not shown) that detects a position of the die cushion mechanism in the vertical direction and an exclusive position detector (not shown) that detects a position of the slide 24 in the vertical direction can be provided separately, respectively.

FIG. 2 shows one example of a functional block diagram of a controller of a die cushion mechanism according to a first embodiment of the present invention. As shown in FIG. 2, the controller 10 according to the first embodiment includes: a force instructor 51 that instructs the die cushion mechanism 20 to generate the force F; the force detector 21 that detects the force F generated by the die cushion mechanism 20; and a speed instruction generator 52 that generates a speed of the servo motor 18, from a force instruction value C1 instructed by the force instructor 51 and a force detection value D1 detected by the force detector 21.

The speed instruction generator 52 obtains a force difference $\Delta 1$ ($=C1-D1$) between the force instruction value C1 and the force detection value D1, and multiplies a gain G0 to this force difference $\Delta 1$, thereby generating a speed instruction value C2. According to a conventional technique, the gain is constant during the press work. Therefore, when a mechanical characteristic of the die cushion changes according to a force, there is an inconvenience that the response changes due to a change in a physical gain of the force control in the conventional technique. On the other hand, according to the present invention, the gain G0 is changed during the operation of the pressing machine, thereby maintaining a constant response.

Calculation of a gain by the controller of the die cushion mechanism according to the first embodiment of the present invention is explained below with reference to FIG. 2 and FIG. 3. A program 100 of a flowchart shown in FIG. 3, and programs 120, 130, and 200 described later are stored in advance in a storage not shown in the controller 10.

Figures 3, 4A, 4B, 4C:
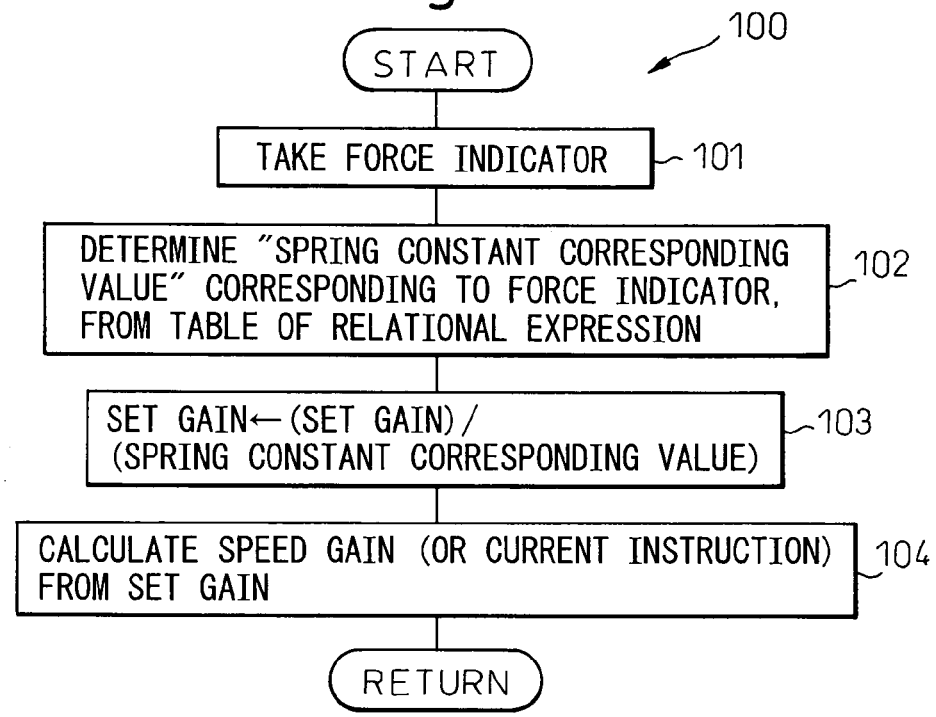
FIG. 3 is a flowchart of a process of obtaining a gain by the controller of the die cushion mechanism according to the first embodiment of the present invention.
FIG. 4a is a diagram showing a relationship between a force indicator F and a spring constant corresponding value k.
FIG. 4b is a diagram showing a relationship between displacement x and the spring constant corresponding value k.
FIG. 4c is a diagram showing a relationship between a position indicator H and the spring constant corresponding value k.

Referring to FIG. 3, at step 101, the controller 10 accepts a force indicator F generated between the die cushion mechanism 20 and the slide 24. In the present invention, the force indicator F is a value expressing the force generated between the die cushion mechanism 20 and the slide 24. The force instruction value C1 instructed by the force instructor 51 or the force detection value D1 detected by the force detector 21 is used for the force indicator F. In FIG. 2, dotted lines indicate flows of the force instruction value C1 and the force detection value D1 that are used to calculate the gain. An OR circuit 58 selects a predetermined one of the force instruction value C1 and the force detection value D1, and supplies the selected value to the speed instruction generator 52, as the force indicator F. When it is set in advance that the OR circuit 58 selects the force instruction value C1, a gain can be obtained in a relatively simple configuration, as described later. On the other hand, when it is set in advance that the OR circuit 58 selects the force detection value D1, a gain can be set more properly based on the actual detection value.

At step 102, the controller 10 determines a spring constant corresponding value k of the spring element 30, from the force indicator F. The storage, not shown, of the controller 10 stores in advance a table (see FIG. 4*a*) showing a relationship between the force indicator F and the spring constant corresponding value k. The spring constant corresponding value k is a value obtained by dividing the force working in a vertical direction between the slide 24 and the die cushion mechanism 20, by displacement of the spring element 30 in a vertical direction. A table showing a relationship between the spring constant corresponding value k and the force indicator F is obtained in advance by experiment or the like. When the spring element 30 and the cushion pad 16 are collectively used as the single spring element 30, a table, not shown, obtained in a similar manner for this spring element 30, is referenced. At step 102, the spring constant corresponding value k is determined from the force indicator F, based on the table shown in FIG. 4a. In place of the table shown in FIG. 4a, a predetermined relationship between the force indicator F and the spring constant corresponding value k can be used to calculate the spring constant corresponding value k.

At step 103, the controller 10 divides the current set gain G0 (i.e., the force gain, in the present embodiment) by the spring constant corresponding value k, thereby obtaining a new set gain G0. At step 103, because the gain is set to be inversely proportional to the spring constant corresponding value k, a physical gain (=the gain×the spring constant corresponding value k) is maintained at a substantially constant value during the operation of the pressing machine.

Thereafter, at step 104, the controller 10 calculates a speed instruction C2 (=G0×Δ1) of the servo motor 18, from the new set gain G0. As shown in FIG. 2, the controller 10 outputs this speed instruction C2 to the servo motor 18. The controller 10 performs this control repeatedly during the operation of the pressing machine, and occasionally changes the gain to be maintained at a constant level. In the present invention, because the controller 10 changes the gain using the spring constant corresponding value k determined from the force indicator F, the response can be maintained at a constant level, thereby controlling the die cushion mechanism in high precision.

While the speed instruction C2 is calculated based on what is called a proportional operation in the above example, the speed instruction C2 can be also calculated based on other method, such as a PI operation, for example.

A method of calculating the speed instruction C2 based on the PI operation is briefly explained below. In this case, the force difference Δ1 (=C1−D1) between the force instruction value C1 and the force detection value D1 is obtained at the beginning in a similar manner. Next, a first gain G1 (i.e., a force gain, in the present example) to be multiplied to the force difference Δ1 and a second gain G2 (i.e., a force gain, in the present example) to be multiplied to an integration value ∫Δ1 of the force difference Δ1 are obtained. The first gain G1 and the second gain G2 are obtained in a similar manner to that of obtaining the gain G0. In other words, the force constant k corresponding to the force indicator F is obtained from the table shown in FIG. 4a. Next, as in the process at step 103, the controller 10 divides the current first gain G1 and the current second gain G2 by the spring constant corresponding value k, thereby obtaining a new first gain G1 and a new second gain G2, respectively. The controller 10 adds a product of the integration value ∫Δ1 of the force difference Δ1 and the new second gain G2 (i.e., G2×∫Δ1) to a product of the force difference Δ1 and the new first gain G1 (i.e., G1×Δ1), thereby obtaining and outputting a speed instruction C2 (=G1×Δ1+G2×∫Δ1). In this case, because the two gains are used, the controller 10 can perform control with a higher precision than that of the above example.

Figure 5:
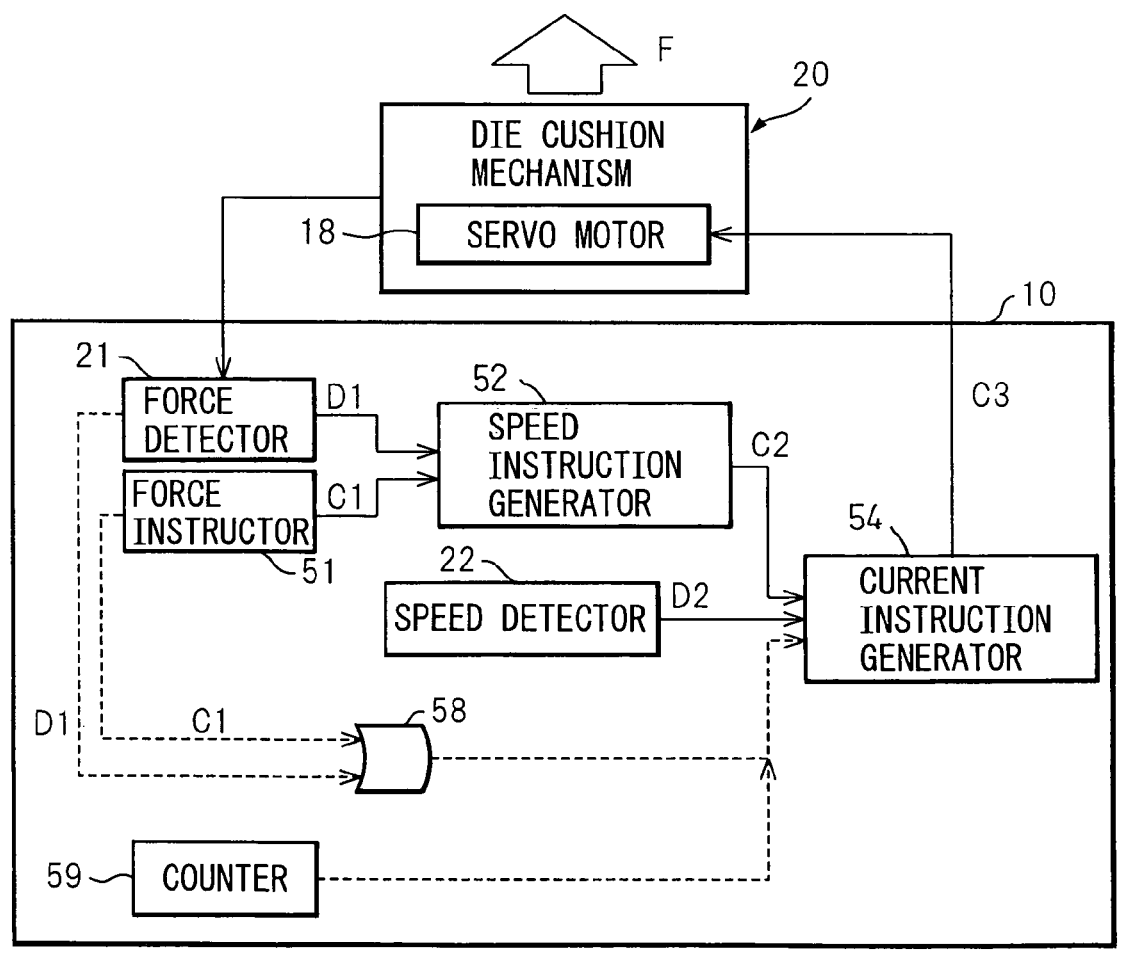
FIG. 5 shows another example of a functional block diagram of the controller of the die cushion mechanism according to the first embodiment of the present invention.

FIG. 5 shows another example of a functional block diagram of the controller of the die cushion mechanism according to the first embodiment of the present invention. In FIG. 5, the speed instruction generator 52 generates the speed instruction C2 from the force instruction value C1 instructed by the force instructor 51 and the force detection value D1 detected by the force detector 21. In the example shown in FIG. 5, the speed instruction C2 is generated based on the proportional operation or the PI operation described above. The gain G0 or the gains G1 and G2 used to generate the speed instruction C2 remain unchanged from the predetermined set values, and these gains are not changed by the spring constant corresponding value k.

In the example shown in FIG. 5, the generated speed instruction C2 is supplied to a current instruction generator 54 of the controller 10. On the other hand, the motor speed detector 22 provided in the servo motor 18 detects a rotation speed of the servo motor 18, as a speed detection value D2, and supplies the speed detection value D2 to the current instruction generator 54.

The current instruction generator 54 obtains a speed difference Δ2 (=C2−D2) between the speed instruction value C2 and the speed detection value D2, and multiplies a gain G3 (i.e., a speed gain, in the present example) by this speed difference Δ2, thereby generating a current instruction value C3. According to the conventional technique, the gain is constant during the press work. Therefore, when a mechanical characteristic of the die cushion changes according to force, there is inconvenience that the response changes due to a change in the physical gain of the force control in the conventional technique. On the other hand, according to the present invention, the gain G3 is changed during the operation of the pressing machine, thereby maintaining a constant response.

The method of calculating a gain is approximately similar to that of the flowchart shown in FIG. 3. Therefore, a difference is mainly explained below. At step 101, the OR circuit 58 selects a predetermined one of the speed instruction value C2 and the speed detection value D2, and supplies the selected value to the current instructor 54, as the force indicator F. At step 102, the controller 10 determines the spring constant corresponding value k using the table shown in FIG. 3a or a predetermined relational expression.

At step 103, the controller 10 divides the current set gain G3 by the spring constant corresponding value k, thereby obtaining a new set gain G3. Next, at step 104, the controller 10 calculates the current instruction C3 (=G3×Δ2) of the servo motor 18 from the new set gain G3. As shown in FIG. 5, the controller 10 outputs this current instruction C3 to the servo motor 18. The controller 10 performs this control repeatedly during the operation of the pressing machine, and occasionally changes the gain to be maintained at a constant level. In the present embodiment, because the controller 10 changes the gain using the spring constant corresponding value k determined from the force indicator F, the response can be maintained at a constant level, thereby controlling the die cushion mechanism in high precision.

It is of course possible to calculate the current instruction C3, based on the PI operation. In this case, the speed difference Δ2 (=C2−D2) between the speed instruction value C2 and the speed detection value D2 is obtained at the beginning in a similar manner. Next, a first gain G4 (i.e., a speed gain, in the present example) to be multiplied to the force difference Δ2 and a second gain G5 (i.e., a speed gain, in the present example) to be multiplied to an integration value ∫Δ2 of the speed difference Δ2 are obtained. The first gain G4 and the second gain G5 are obtained in a similar manner to that of obtaining the gain G0. In other words, the spring constant corresponding value k corresponding to the force indicator F is obtained from the table shown in FIG. 4a. Next, as in the process at step 103, the controller 10 divides the current first gain G4 and the current second gain G5 by the spring constant corresponding value k, thereby obtaining a new first gain G4 and a new second gain G5, respectively. A product of the integration value $\int\Delta 2$ of the speed difference $\Delta 2$ and the new second gain G5 (i.e., G5×$\int\Delta 2$) is added to a product of the speed difference $\Delta 2$ and the new first gain G4 (i.e., G4×$\Delta 2$), thereby obtaining and outputting a current instruction C3 (=G4×$\Delta 2$+G5×$\int\Delta 2$). In this case, because the two gains are used, the controller 10 can perform control with higher precision than that of the above example.

Figure 6:
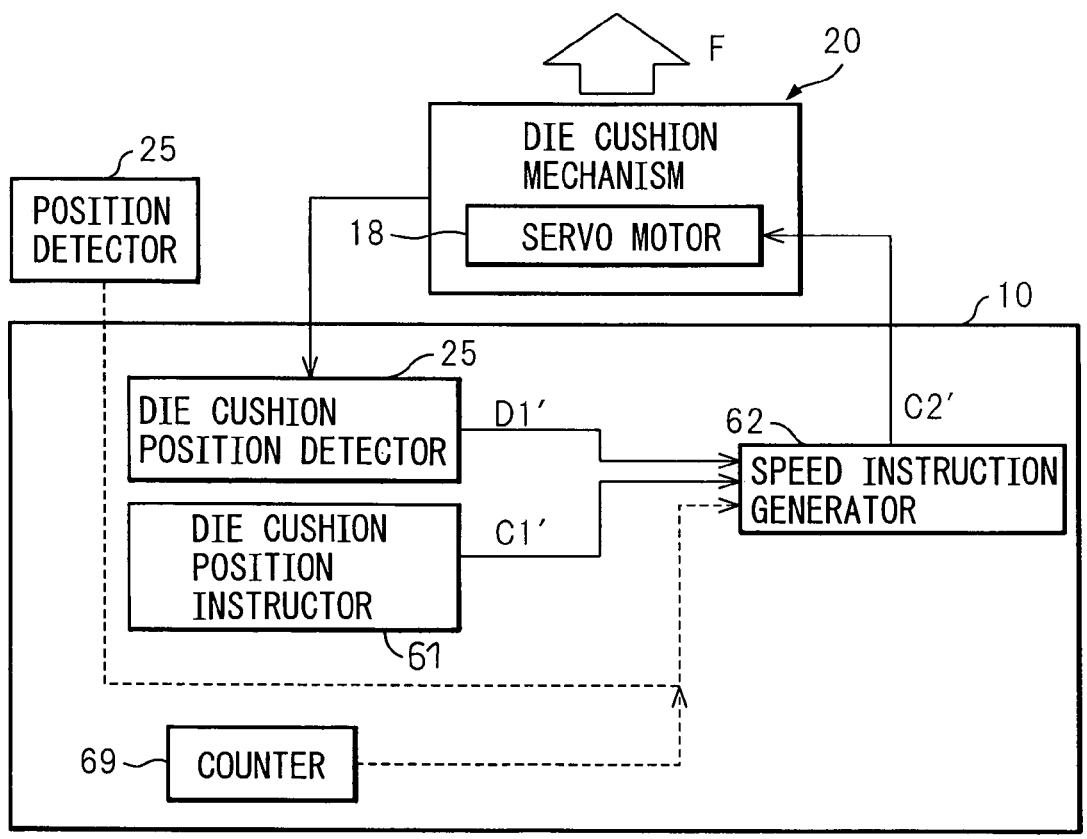
FIG. 6 shows one example of a functional block diagram of a controller of a die cushion mechanism according to a second embodiment of the present invention.

FIG. 6 shows one example of a functional block diagram of a controller of a die cushion mechanism according to a second embodiment of the present invention. As shown in FIG. 6, the controller 10 according to the second embodiment includes: a die cushion position instructor 61 that instructs a position of the die cushion mechanism 20, for example, a position of the die cushion pad 16, so that displacement of the spring element 30 detected by the position detector 25 becomes a predetermined displacement; a die cushion position detector 25 that detects a position of the die cushion mechanism 20, for example, a position of the die cushion pad 16; and a speed instruction generator 62 that generates a speed of the servo motor 18 from a die cushion position instruction value C1' instructed by the die cushion position instructor 61 and a die cushion position detection value D1' detected by the die cushion position detector 25.

The speed instruction generator 62 obtains a position difference $\Delta 1'$ (=C1'−D1') between a die cushion position instruction value C1' and a die cushion position detection value D1', and multiplies a gain G0' (i.e., a position gain, in this example) to this position difference $\Delta 1'$, thereby generating a speed instruction value C2'. According to a conventional technique, the gain is constant during the press work. Therefore, when a mechanical characteristic of the die cushion changes according to force, there is inconvenience that the response changes due to a change in a physical gain of the force control. On the other hand, according to the present invention, the gain G0' is changed during the operation of the pressing machine, thereby maintaining a constant response.

A method of calculating a gain by the controller of the die cushion mechanism according to the second embodiment of the present invention is explained below with reference to FIG. 6 and a program 120 shown in FIG. 7.

At step 121 of the program 120, the controller 10 accepts the displacement of the spring element 30 of the die cushion mechanism 20 detected by the die cushion position detector 25. Referring to FIG. 1a, the pressing machine is in the opened state. In FIG. 1a, an upper end and a lower end of the spring element 30, that are in a vertical relationship, are indicated as A1 and B1, respectively. When the pressing machine is closed as shown in FIG. 1b, the spring element 30 is displaced in a vertical direction, and the positions of the upper end and the lower end of the spring element 30 change to A2 and B2, respectively. In this case, the controller 10 calculates displacement x of the spring element 30 as x={(A1−B1)−(A2−B2)}. As is clear from FIG. 6, the displacement x is supplied to the speed instruction generator 62.

At step 122, the controller 10 determines the spring constant corresponding value k of the spring element 30, from the taken displacement x. The storage not shown of the controller 10 stores in advance a table (see FIG. 4b) showing a relationship between the displacement x and the spring constant corresponding value k. At step 122, the controller 10 determines the spring constant corresponding value k from the displacement x, based on the table shown in FIG. 4b. In place of the table shown in FIG. 4b, a predetermined relational expression between the displacement x and the spring constant corresponding value k can be used to calculate the spring constant corresponding value k.

At step 123, the controller 10 divides the current set gain G0' by the spring constant corresponding value k, thereby obtaining a new set gain G0'. At step 123, because the gain is set to be inversely proportional to the spring constant corresponding value k, the controller 10 maintains a physical gain (=the gain×the spring constant corresponding value k) at a substantially constant value during the operation of the pressing machine.

Thereafter, at step 124, the controller 10 calculates a speed instruction C2' (=G0'×$\Delta 1'$) of the servo motor 18, from the new set gain G0'. As shown in FIG. 6, the controller 10 outputs this speed instruction C2' to the servo motor 18. The controller 10 performs this control repeatedly during the operation of the pressing machine, and occasionally changes the gain to be maintained at a constant level. In the present invention, because the controller 10 changes the gain using the spring constant corresponding value k determined from the displacement x, the response can be maintained at a constant level, thereby controlling the die cushion mechanism in high precision.

In the present embodiment, the speed instruction C2' can be also calculated based on the PI operation. In this case, the position difference $\Delta 1'$ (=C1'−D1') between the die cushion position instruction value C1' and the die cushion position detection value D1' is also obtained at the beginning in a similar manner. Next, a first gain G1' (i.e., a position gain, in the present example) to be multiplied to the position difference $\Delta 1'$ and a second gain G2' (i.e., a position gain, in the present example) to be multiplied to an integration value $\int\Delta 1'$ of the position difference $\Delta 1'$ are obtained. The first gain G1' and the second gain G2' are obtained in a similar manner to that of obtaining the gain G0'. In other words, the spring constant corresponding value k corresponding to the displacement x is obtained from the table shown in FIG. 4b. Next, as in the process at step 103, the controller 10 divides the current first gain G1' and the current second gain G2' by the spring constant corresponding value k, thereby obtaining a new first gain G1' and a new second gain G2'. A product (i.e., G2'×$\int\Delta 1'$) of the integration value $\int\Delta 1'$ of the position difference $\Delta 1'$ and the new second gain G2' is added to a product (i.e., G1'×$\Delta 1'$) of the position difference $\Delta 1'$ and the new first gain G1', thereby obtaining and outputting a speed instruction C2' (=G1'×$\Delta 1'$+G2'×$\int\Delta 1'$). In this case, because the two gains are used, the controller 10 can perform the control in higher precision than that of the above example.

Figure 8:
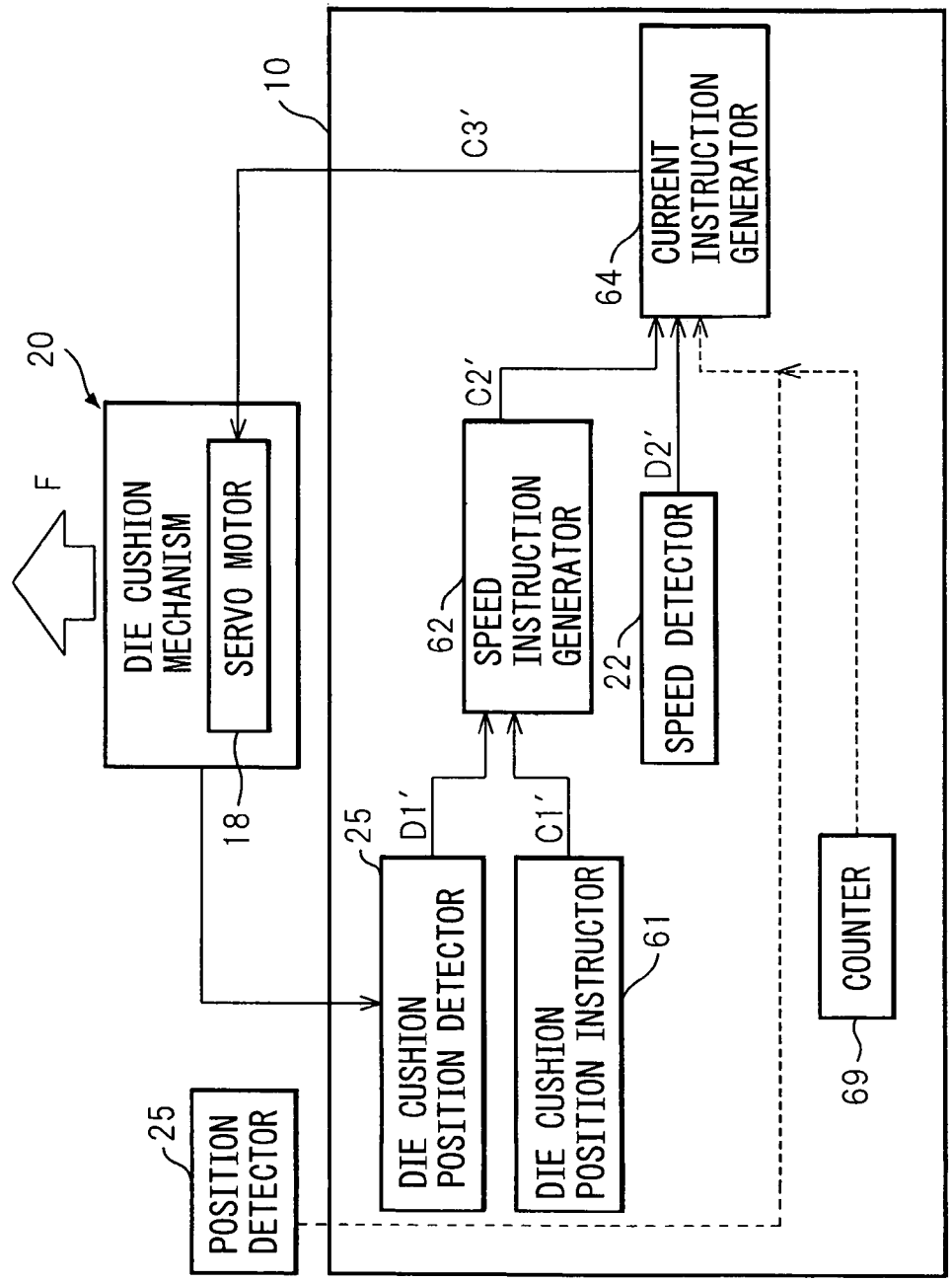
FIG. 8 shows another example of a functional block diagram of the controller of the die cushion mechanism according to the second embodiment of the present invention.

FIG. 8 shows another example of a functional block diagram of the controller of the die cushion mechanism according to the second embodiment of the present invention. In FIG. 8, the speed instruction generator 62 generates the speed instruction C2' from the die cushion position instruction value C1' instructed by the die cushion position instructor 61 and the die cushion position detection value D1' detected by the die cushion position detector 25. In the example shown in FIG. 8, the speed instruction C2' is generated based on the proportional operation or the PI operation described above. The gain G0' or the gains G1' and G2' used to generate the speed instruction C2' remain unchanged from the predetermined set values, and these gains are not changed by the spring constant corresponding value k.

In the example shown in FIG. 8, the generated speed instruction C2' is supplied to a current instruction generator 64 of the controller 10. On the other hand, the motor speed detector 22 provided in the servo motor 18 detects a rotation speed of the servo motor 18, as a speed detection value D2', and supplies the speed detection value D2' to the current instruction generator 64.

The current instruction generator 64 obtains a speed difference Δ2' (=C2'−D2') between the speed instruction value C2' and the speed detection value D2', and multiplies a gain G3' (i.e., a speed gain, in the present example) by this speed difference Δ2', thereby generating a current instruction value C3'. According to the conventional technique, the gain is constant during the press work. Therefore, when a mechanical characteristic of the die cushion changes according to a force, there is inconvenience that the response changes due to a change in a physical gain of the force control. On the other hand, according to the present invention, the gain G3' is changed during the operation of the pressing machine, thereby maintaining a constant response.

Figure 7:
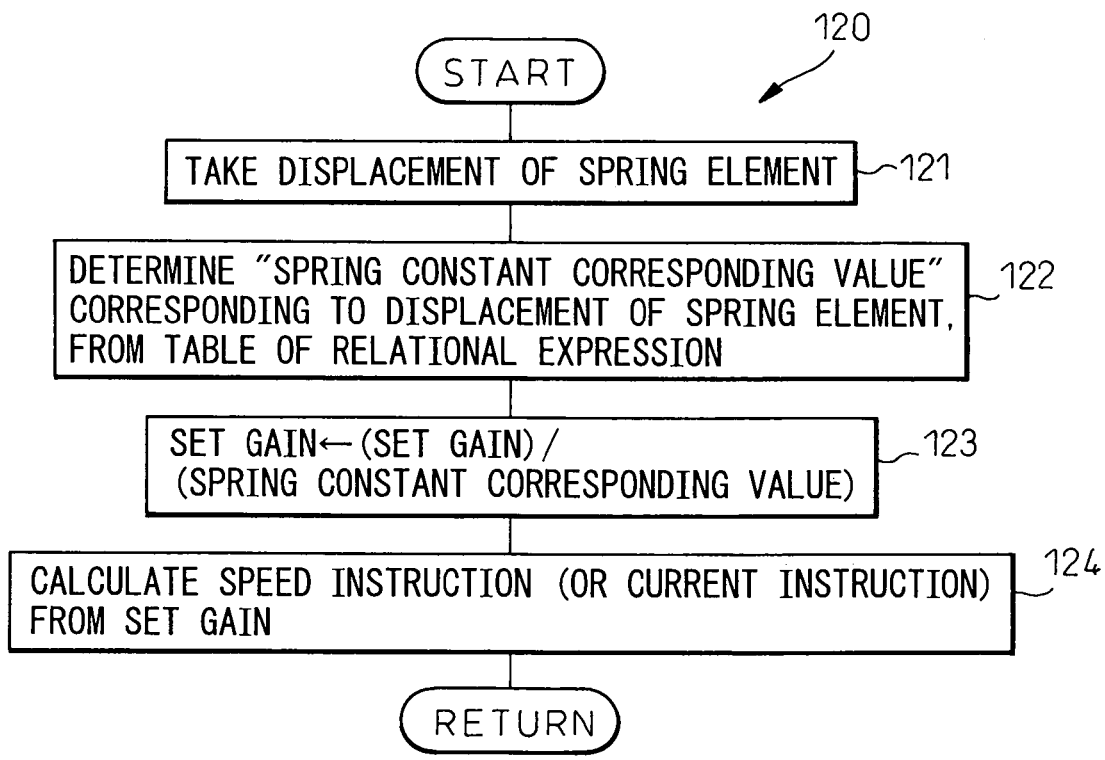
FIG. 7 is a flowchart of a process of obtaining a gain by the controller of the die cushion mechanism according to the second embodiment of the present invention.

The method of calculating a gain is approximately similar to that of the flowchart shown in FIG. 7. Therefore, a difference is mainly explained below. At step 121 of the program 120, the controller 10 calculates the displacement x of the spring element 30 as described above, and takes the displacement x. At step 122, the controller 10 determines the spring constant corresponding value k using the table shown in FIG. 3b or a predetermined relational expression.

At step 123, the controller 10 divides the current set gain G3' by the spring constant corresponding value k, thereby obtaining a new set gain G3'. Next, at step 124, the controller 10 calculates the current instruction C3' (=G3'×Δ2') of the servo motor 18 using the new set gain G3'. As shown in FIG. 8, the controller 10 outputs this current instruction C3' to the servo motor 18. The controller 10 performs this control repeatedly during the operation of the pressing machine, and occasionally changes the gain to be maintained at a constant level. In the present embodiment, because the controller 10 changes the gain using the spring constant corresponding value k determined from the displacement x, the response can be maintained at a constant level, thereby controlling the die cushion mechanism in high precision.

It is of course possible to calculate the current instruction C3', based on the PI operation. In this case, the speed difference Δ2' (=C2'−D2') between the speed instruction value C2' and the speed detection value D2' is obtained, at the beginning, in a similar manner. Next, a first gain G4' (i.e., a speed gain, in the present example) to be multiplied to the speed difference Δ2' and a second gain G5' (i.e., a speed gain, in the present example) to be multiplied to an integration value ∫Δ2' of the speed difference Δ2' are obtained. The first gain G4' and the second gain G5' are obtained in a similar manner to that of obtaining the gain G0'. In other words, the spring constant corresponding value k corresponding to the displacement x is obtained from the table shown in FIG. 4b. Next, as in the process at step 123, the controller 10 divides the current first gain G4' and the current second gain G5' by the spring constant corresponding value k, thereby obtaining a new first gain G4' and a new second gain G5', respectively. A product (i.e., G5'×∫Δ2') of the integration value ∫Δ2' of the speed difference Δ2' and the new second gain G5' is added to a product (i.e., G4'×Δ2') of the speed difference Δ2' and the new first gain G4', thereby obtaining and outputting a current instruction C3' (=G4'×Δ2'+G5'×∫Δ2'). In this case, because the two gains are used, the controller 10 can perform the control with higher precision than that of the above example. It is clear that the force detector 21 can be excluded from the configurations according to the second embodiment shown in FIG. 6 and FIG. 8.

Figure 9:
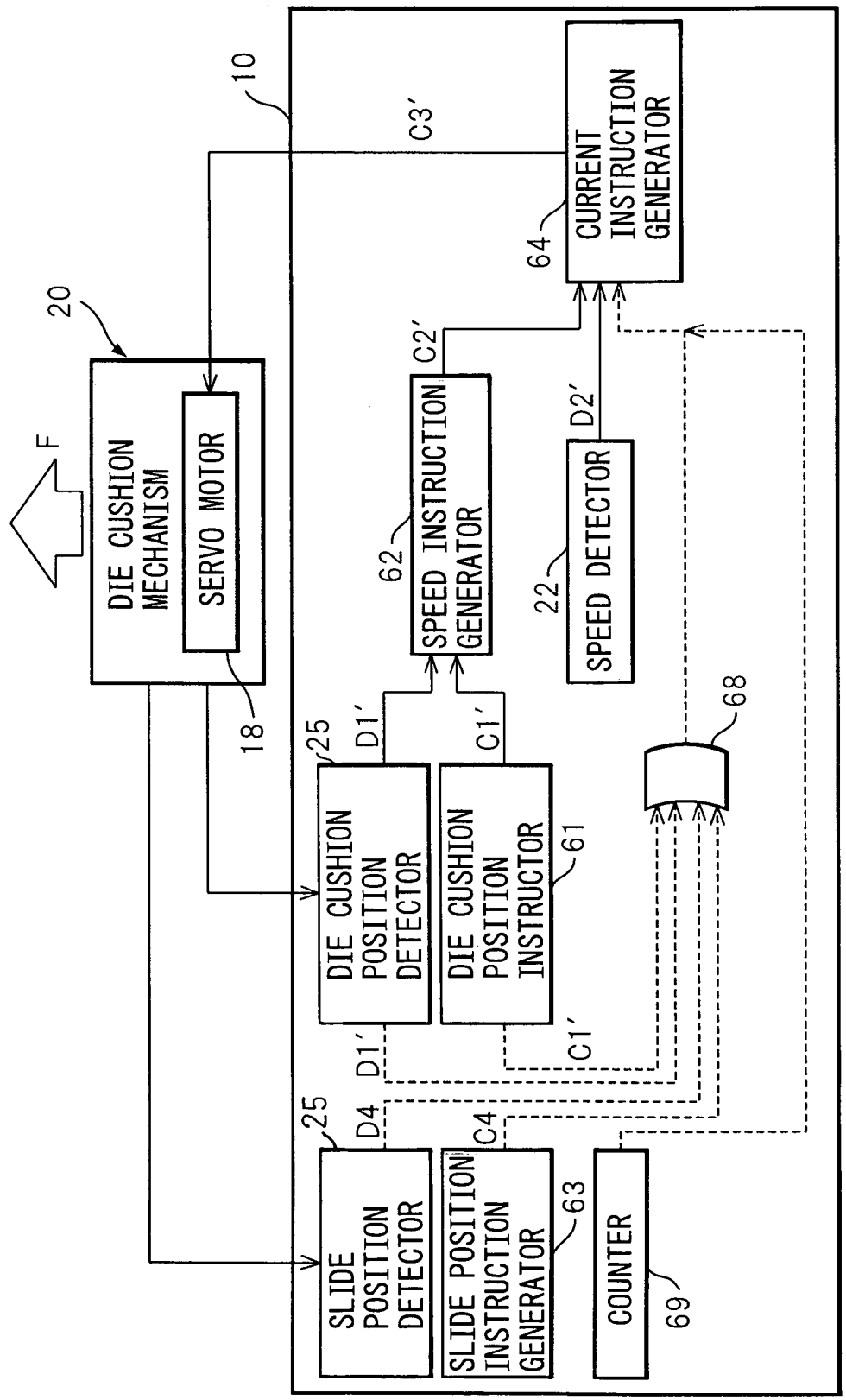
FIG. 9 shows one example of a functional block diagram of a controller of a die cushion mechanism according to a third embodiment of the present invention.

FIG. 9 shows one example of a functional block diagram of a controller of a die cushion mechanism according to a third embodiment of the present invention. In the example shown in FIG. 9, the speed instruction generator 62 generates the speed instruction C2' from the die cushion position instruction value C1' instructed by the die cushion position instructor 61 and the die cushion position detection value D1' detected by the die cushion position detector 25, as in the example shown in FIG. 6. In the example shown in FIG. 9, the speed instruction C2' is generated based on the proportional operation or the PI operation described above. The gain G0' or the gains G1' and G2' used to generate the speed instruction C2' remain unchanged from the predetermined set values, and these gains are not changed by the spring constant corresponding value k.

In FIG. 9, the generated speed instruction C2' is supplied to the current instruction generator 64 of the controller 10. On the other hand, the motor speed detector 22 provided in the servo motor 18 detects a rotation speed of the servo motor 18, as the speed detection value D2', and supplies the speed detection value D2' to the current instruction generator 64.

The current instruction generator 64 obtains the speed difference Δ2' (=C2'−D2') between the speed instruction value C2' and the speed detection value D2', and multiplies the gain G3' (i.e., a speed gain, in the present example) to this speed difference Δ2', thereby obtaining the current instruction value C3' in a similar manner.

Figure 10:
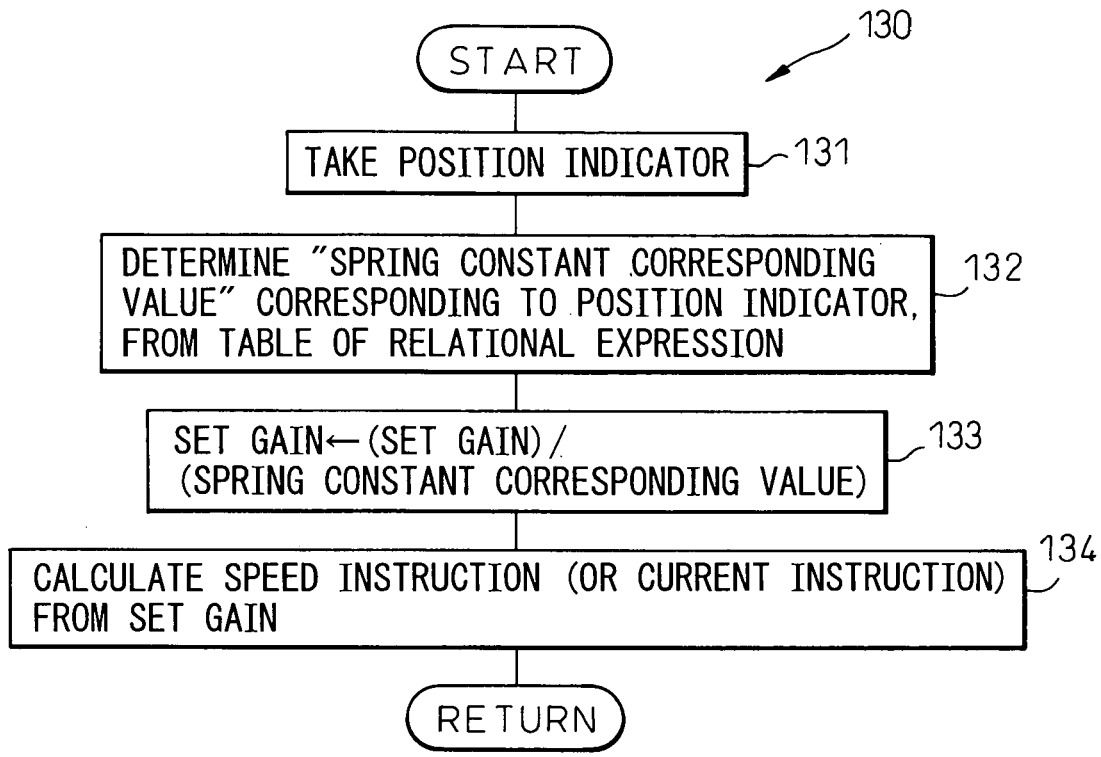
FIG. 10 is a flowchart of a process of obtaining a gain by the controller of the die cushion mechanism according to the third embodiment of the present invention.

A method of calculating a gain according to the third embodiment is explained below with reference to a program 130 shown in FIG. 10. At step 131 of the program 130 in FIG. 10, the controller 10 takes a position indicator H concerning the die cushion mechanism 20. In the present invention, the position indicator H is a value that expresses a position of at least a part (for example, the cushion pad 16) of the die cushion mechanism 20 during the operation of the pressing machine. For example, the position indicator H may be the die cushion position instruction value C1' instructed by the die cushion position instructor 61 or the die cushion position detection value D1' detected by the die cushion position detector 25. If the servo motor 18 drives the slide 24, a slide position instruction value C4 of the slide 24 instructed by the slide position instruction generator 63 or a slide position detection value D4 of the slide 24 detected by the slide position detector 25 when closing of the pressing machine can be used for the position indicator H.

In FIG. 9, dotted lines indicate flows of the die cushion position instruction value C1', the die cushion position detection value D1', the slide position instruction value C4, and the slide position detection value D4 that are used to calculate the gain. An OR circuit 68 selects a predetermined one of these values, and supplies the selected value to the current instruction generator 64, as the position indicator H. When it is set in advance that the OR circuit 68 selects the die cushion position instruction value C1' or the slide position instruction value C4, a gain can be obtained in a relatively simple configuration, as described later. On the other hand, when it is set in advance that the OR circuit 68 selects the die cushion position detection value D1' or the slide position detection value D4, a gain can be set more properly based on the actual detection value.

At step 132, the controller 10 determines the spring constant corresponding value k of the spring element 30, from the taken position indicator H. The storage, not shown, of the controller 10 stores in advance a table (see FIG. 4c) showing a relationship between the position indicator H and the spring constant corresponding value k, like the table shown in FIG. 3a as described above. At step 132, the controller 10 determines the spring constant corresponding value k from the position indicator H, based on the table shown in FIG. 4c. In place of the table shown in FIG. 4c, a predetermined relational expression between the position indicator H and the spring constant corresponding value k can be used to calculate the spring constant corresponding value k.

At step 133, the controller 10 divides the current set gain G3' by the spring constant corresponding value k, thereby obtaining a new set gain G3'. Thereafter, at step 134, the controller 10 calculates the current instruction C3' (=G3'×Δ1') of the servo motor 18, from the new set gain G3'. As shown in FIG. 9, the controller 10 outputs this speed instruction C3' to the servo motor 18. The controller 10 performs this control repeatedly during the operation of the pressing machine, and occasionally changes the gain to maintain it at a constant level. In the present embodiment, because the controller 10 changes the gain using the spring constant corresponding value k determined from the position indicator H, the response can be maintained at a constant level, thereby controlling the die cushion mechanism with high precision. According to the third embodiment shown in FIG. 9, a gain can be changed without detecting displacement of the spring element 30. It is of course possible to calculate the current instruction C3', based on the PI operation, like in the above embodiment.

Figure 11:
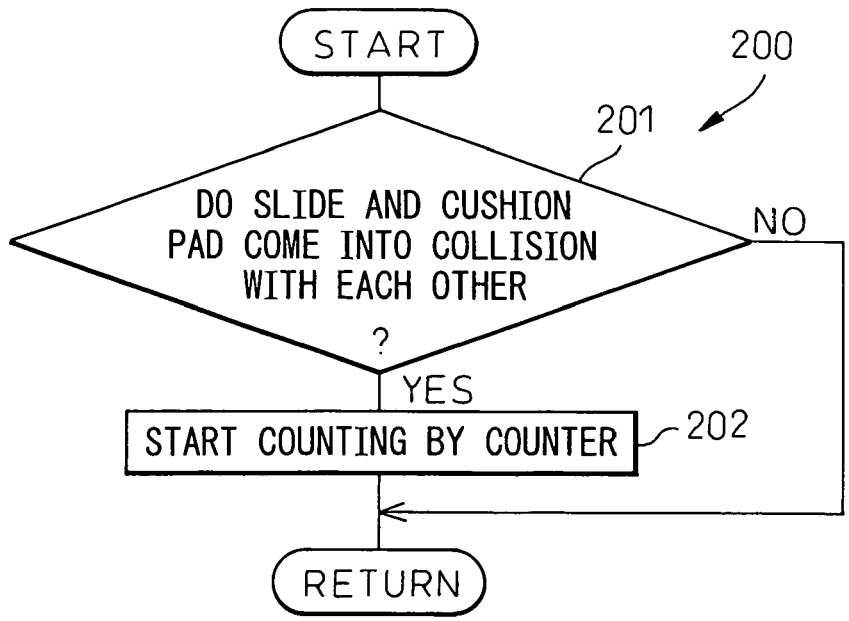
FIG. 11 is a flowchart for explaining a process of using of a counter.

The counter 59 or the counter 69 connected to the speed instruction generator 52 and 62 or current instruction generator 54 and 64 is shown In FIG. 2, FIG. 5, FIG. 6, FIG. 8, and FIG. 9. These counters 59 and 69 record a lapse time from the start of the operation of the pressing machine and, particularly, a lapse time from a start of a collision between the slide 24 and the cushion pad 16. FIG. 11 shows the operation of the counters 59 and 69 that record a lapse time from a start of a collision between the slide 24 and the cushion pad 16. As is clear from the program 200 shown in a flowchart in FIG. 11, when the slide 24 and the cushion pad 16 come into collision with each other (step 201), the counters 59 and 69 start counting (step 202).

This program 200 can interrupt the programs 100, 120, and 130 described above. Specifically, in the program 200 interrupt before the first steps 101, 121, and 131 of the programs 100, 120, and 130, the program 200 counts the lapse time when the collision occurs. When the collision occurs, a table (i.e., a map) considering a count value CNT can be used to determine the spring constant corresponding value k in each program (steps 102, 122, and 132).

FIG. 12a to FIG. 12c show maps of the spring constant corresponding value k. These maps are used in the programs 100, 120, and 130, respectively. As is clear from these drawings, the spring constant corresponding value k is obtained in advance by experiment or the like, as a function of the force indicator F (or the displacement x, or the position indicator H) and the count value CNT of the counters 59 and 69. The spring constant corresponding value k is stored in the storage (not shown) of the controller 10, in the form of a map. It is known in advance that a mechanical characteristic changes according to lapse of time from a start of a collision between the slide and the die cushion mechanism. Therefore, in the present example, the spring constant corresponding value k can be obtained, more properly, by considering the time from a start of a clamp. Consequently, the gain can be changed more properly.

In place of the count value CNT from the collision between the slide 24 and the cushion pad 16, the count value CNT from the start of the operation of the pressing machine can be used. In this case, approximately the same effect as that described above can be obtained.

Although not shown in the drawings, in place of taking the force indicator F, the displacement x, and the position indicator H at steps 101, 121, and 131 of the programs 100, 120, and 130, respectively, the count value CNT of the counters 59 and 69 can be taken. Then, the spring constant corresponding value k can be determined from a table (not shown) of the relationship between the count value CNT and the spring constant corresponding value k shown in FIG. 4a.

While preferred embodiments of the present invention have been described above, the present invention is not limited to these embodiments, and various modifications can be made to these embodiments within the scope of claims. For example, at the time of generating the speed instructions C2 and C2' or the current instructions C3 and C3' based on the PI operation, only one of the first gain and the second gain can be changed. In the embodiment of generating the current instruction C3, a gain can be changed both at the time of generating the speed instruction C2 and at the time of generating the current instruction C3.

While the present invention has been explained with reference to the representative embodiments, those skilled in the art will be able to carry out the above changes and other various changes, omissions, and additions, without deviating from the scope of the present invention.

What is claimed is:

1. A controller for a die cushion mechanism that generates force on a slide of a pressing machine using a servo motor as a driving source, the controller comprising:
   a spring element that is displaced according to a force between the die cushion mechanism and the slide;
   a force instructor that instructs force to be generated between the die cushion mechanism and the slide;
   a force detector that detects force generated between the die cushion mechanism and the slide; and
   a speed instruction generator that generates a speed instruction of the servo motor, based on a force instruction value instructed by the force instructor and a force detection value detected by the force detector, wherein
   the speed instruction generator generates the speed instruction by multiplying a force gain to a force difference determined from a difference between the force instruction value and the force detection value, and
   the speed instruction generator changes the force gain, based on a spring constant corresponding value of the spring element determined from a force indicator that works between the slide and the die cushion.

2. The controller for a die cushion mechanism according to claim 1, wherein the force indicator is a force instruction value instructed by the force instructor.

3. The controller for a die cushion mechanism according to claim 1, wherein the force indicator is a force detection value detected by the force detector.

4. The controller for a die cushion mechanism according to claim 1, wherein the force gain is changed according to time.

5. The controller for a die cushion mechanism according to claim 4, wherein the time is a time from a start of a collision between the die cushion mechanism and the slide.

6. A controller for a die cushion mechanism that generates force on a slide of a pressing machine using a servo motor as a driving source, the controller comprising:
   a spring element that is displaced according to a force between the die cushion mechanism and the slide;
   a force instructor that instructs force to be generated between the die cushion mechanism and the slide;
   a force detector that detects force generated between the die cushion mechanism and the slide; and
   a speed instruction generator that generates a speed instruction of the servo motor, based on a force instruction value instructed by the force instructor and a force detection value detected by the force detector, wherein the speed instruction generator generates the speed instruction, by adding a product of an integration value of a force difference and a second force gain to a product of the force difference and a first force gain, the force difference being determined from a difference between the force instruction value and the force detection value, and the speed instruction generator changes either one of or both the first force gain and the second force gain, based on a spring constant corresponding value of the spring element determined from a force indicator that works between the slide and the die cushion.

7. A controller for a die cushion mechanism that generates force on a slide of a pressing machine using a servo motor as a driving source, the controller comprising:

a spring element that is displaced according to a force between the die cushion mechanism and the slide;

a force instructor that instructs force to be generated between the die cushion mechanism and the slide;

a force detector that detects force generated between the die cushion mechanism and the slide;

a speed instruction generator that generates a speed instruction of the servo motor, based on a force instruction value instructed by the force instructor and a force detection value detected by the force detector;

a speed detector that detects a speed of the servo motor; and a current instruction generator that generates a current instruction of the servo motor, based on a speed instruction value instructed by the speed instruction generator and a speed detection value detected by the speed detector, wherein the current instruction generator generates the current instruction by multiplying a speed gain to a speed difference determined from a difference between the speed instruction value and the speed detection value, and the speed instruction generator changes the speed gain, based on a spring constant corresponding value of the spring element determined from a force indicator that works between the slide and the die cushion.

8. The controller for a die cushion mechanism according to claim 7, wherein the speed gain is changed according to time.

9. A controller for a die cushion mechanism that generates force on a slide of a pressing machine using a servo motor as a driving source, the controller comprising:

a spring element that is displaced according to a force between the die cushion mechanism and the slide;

a force instructor that instructs force to be generated between the die cushion mechanism and the slide;

a force detector that detects force generated between the die cushion mechanism and the slide;

a speed instruction generator that generates a speed instruction of the servo motor, based on a force instruction value instructed by the force instructor and a force detection value detected by the force detector;

a speed detector that detects a speed of the servo motor; and a current instruction generator that generates a current instruction of the servo motor, based on a speed instruction value instructed by the speed instruction generator and a speed detection value detected by the speed detector, wherein the current instruction generator generates the current instruction by adding a product of an integration value of a speed difference and a second speed gain to a product of the speed difference and a first speed gain, the speed difference being determined from a difference between the speed instruction value and the speed detection value, and the speed instruction generator changes either one of or both the first speed gain and the second speed gain, based on a spring constant corresponding value of the spring element determined from a force indicator that works between the slide and the die cushion.

* * * * *

UNITED STATES PATENT AND TRADEMARK OFFICE
CERTIFICATE OF CORRECTION

| | | |
|---|---|---|
| PATENT NO. | : 7,619,384 B2 | Page 1 of 1 |
| APPLICATION NO. | : 11/438394 | |
| DATED | : November 17, 2009 | |
| INVENTOR(S) | : Yasusuke Iwashita et al. | |

It is certified that error appears in the above-identified patent and that said Letters Patent is hereby corrected as shown below:

Title Page; item (30);

Page 1, line 30, please insert:

--Foreign Application Priority Data, Japan 2005-150574 filed May 24, 2005--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.       : 7,619,384 B2                                   Page 1 of 1
APPLICATION NO. : 11/438394
DATED            : November 17, 2009
INVENTOR(S)      : Iwashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Twenty-sixth Day of October, 2010

David J. Kappos
*Director of the United States Patent and Trademark Office*